United States Patent
Watanabe

(10) Patent No.: US 7,394,062 B2
(45) Date of Patent: Jul. 1, 2008

(54) DISPLACEMENT-MEASURING OPTICAL SCALE AND OPTICAL ENCODER USING SAME

(75) Inventor: Hiroshi Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 11/282,184

(22) Filed: Nov. 18, 2005

(65) Prior Publication Data
US 2006/0108515 A1 May 25, 2006

(30) Foreign Application Priority Data
Nov. 24, 2004 (JP) ............... 2004-338895

(51) Int. Cl.
*G01D 5/34* (2006.01)
(52) U.S. Cl. ............... 250/231.16; 250/237 G; 250/231.13; 250/231.14; 33/1 N; 356/616
(58) Field of Classification Search ............ 250/231.13, 250/231.14, 231.16, 237 G; 33/1 PT, 1 N, 33/1 L; 356/614, 616, 617; 359/566
See application file for complete search history.

(56) References Cited

U.S. PATENT DOCUMENTS

| | | | | |
|---|---|---|---|---|
| 5,448,358 A | * | 9/1995 | Ishizuka et al. ............. | 356/619 |
| 5,506,681 A | * | 4/1996 | Igaki ............. | 356/616 |
| 5,671,052 A | * | 9/1997 | Kawakubo et al. ............. | 356/616 |
| 5,747,797 A | * | 5/1998 | Fujita ............. | 250/231.14 |

FOREIGN PATENT DOCUMENTS

| JP | 2000-266567 | 9/2000 |
|---|---|---|
| JP | 2003-97975 | 4/2003 |

* cited by examiner

*Primary Examiner*—Georgia Y. Epps
*Assistant Examiner*—Francis M Legasse, Jr.
(74) *Attorney, Agent, or Firm*—Morgan & Finnegan, LLP

(57) ABSTRACT

When a convex lens 13 comes close to 0-th order transmitted light T0 with rotation of an optical scale 11, the 0-th order transmitted light T0 derived from a light beam L emitted from a light source 15 and transmitted through a diffraction grating 12 around is converged and incident on a reference position signal detection sensor 14. At that time, a large output is obtained from the reference position signal detection sensor 14. This signal constitutes a reference position signal. On the other hand, reflective diffracted light beams La, Lb having been reflected by the diffraction grating are detected by a diffraction light detection sensor 16 after interference, so that the speed and the angle etc. of the scale 11 are detected. In this way, the reference position signal and an incremental signal are detected at the same position on the optical scale.

5 Claims, 8 Drawing Sheets

FIG. 12A
PRIOR ART
FIG. 12B
PRIOR ART
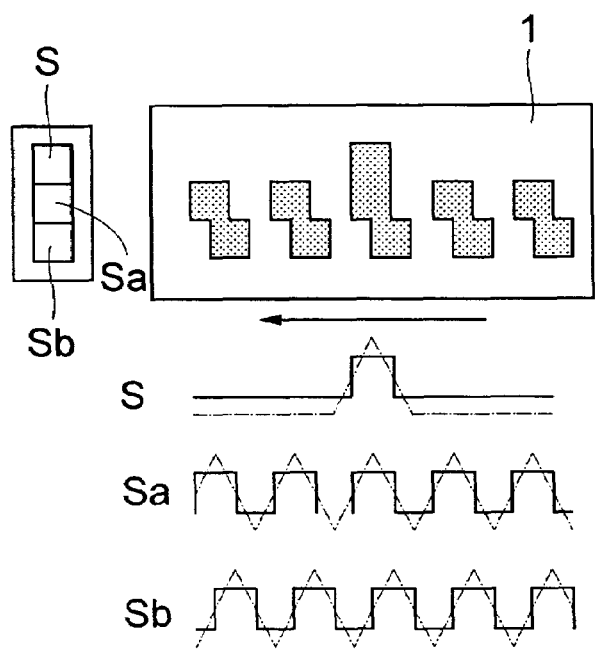
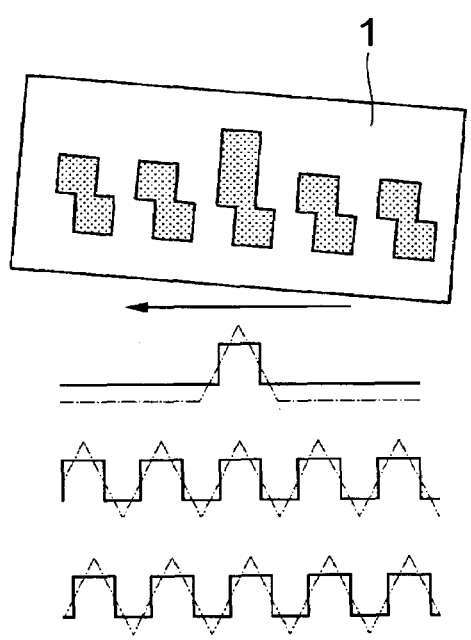

DISPLACEMENT-MEASURING OPTICAL SCALE AND OPTICAL ENCODER USING SAME

BACKGROUND OF THE INVENTION

1. Field of the Invention

The present invention relates to an optical scale that detects the relative angle and relative displacement between a scale and detection means. The present invention also relates to an optical encoder using the same.

2. Related Background Art

Rotary encoders and linear encoders have been used as angle detection sensors or position detection sensors. In particular, in the case where position detection with high resolution is required, an incremental optical encoder is used.

The incremental encoder is a measuring device for detecting a relative angle or a relative displacement by counting two incremental signals, as disclosed in Japanese Patent Application Laid-Open Nos. 2000-266567 and 2003-97975.

However, what can be detected by counting incremental signals is a relative displacement. Therefore, to enable position detection, a reference position signal related to an external coordinate system is needed.

It is possible to obtain such a reference position signal using separate external means.

On the other hand, there has been known an encoder that is adapted to output a datum position signal at a specific position in addition to incremental signals to provide a reference signal by the encoder itself. This datum signal is sometimes referred to as a reference signal or an original point signal.

SUMMARY OF THE INVENTION

Position information with high accuracy is desired in high resolution encoders.

To realize highly accurate position detection, it is necessary to detect a reference position signal with high accuracy.

In a optical scale of a linear encoder, a pattern 3 for generating a reference position signal is typically provided in the vicinity of an incremental pattern 2 of the optical scale 1 as shown in FIG. 9.

The patterns are illuminated with a light beam L having a diameter large enough to cover the patterns 2 and 3 as shown in FIGS. 10 and 11.

By detecting it using an independent detection system 4, a reference position signal is obtained from the reference position signal generating pattern 3.

These patterns 2 and 3 can be irradiated by light beams from different light sources to optimize the optical system. However, such a structure is hardly adopted, since the light source is a relatively expensive part.

A part of a light beam directed to the incremental pattern 2 may be split so as to be used in generating reference position signal. However, such an arrangement leads to complication of the structure.

In the case where a reference position signal is detected by the system shown in FIGS. 9 to 11, if the optical scale that should be properly at the position shown in FIG. 12A is displaced by its movement in a shift or angular direction different from that to be detected as shown in FIG. 12B, the phases of a reference position signal and incremental signals obtained by a reference position signal detection sensor S and two incremental signal detection sensors Sa, Sb respectively will change.

FIG. 12B shows a case where the optical scale 1 has been displaced in a rotational direction. In the case of a rotary encoder, a change in the phase also occurs if the rotation center is displaced.

To reduce such displacement, the detection position of the incremental signal and the detection position of the reference position signal are generally arranged close to each other. However, a small displacement sometimes matters in cases where high accuracy in detection is required.

The above-described angular displacement of the optical scale 1 is generated due to inclination in terms of precision in a linear movement guide with respect to linear movement, and due to fluctuation of the rotation center in terms of precision in rotary shaft with respect to rotational movement. Even if there are such variations in the posture, detection results of the reference position signal and the two incremental signals will be always the same in the case where the variations have positional repeatability (repeatable variations). However, variations that do not have positional repeatability (non-repeatable variations) occur in reality, which will cause the above-mentioned error. In this case, position information represented by one of the two incremental signals and position information represented by the other incremental signal are different from each other, and it is necessary to determined which signal is the correct signal to be used.

An object of the present invention is to provide an optical scale that can generate a reference position signal as well as two incremental signals with high accuracy using the same light source.

To achieve the above object, according to the present invention, there is provided an optical scale for outputting an incremental signal and a reference position signal technically characterized in that a pattern for generating an incremental signal and a pattern for generating a reference position signal are formed on a substrate, and unnecessary transmitted light or unnecessary reflected light that is not used in generating the incremental signal, derived from a light beam having been incident on the pattern for generating the incremental signal, is made incident on the pattern for generating the reference position signal that is provided coaxially.

In the optical scale according to the present invention, it is possible to detect the reference signal and the incremental signal at the same position, and therefore relationship between the phases of the incremental signal and the reference position signal is not influenced by changes in the posture of the optical scale. Accordingly, position detection and angle detection with high accuracy can be made possible.

BRIEF DESCRIPTION OF THE DRAWINGS

FIGS. 12A and 12B illustrate how output signals changes with changes in the posture of the conventional optical scale.

DESCRIPTION OF THE PREFERRED EMBODIMENTS

The present invention will be described in detail based on embodiments shown in FIGS. 1 to 8.

First Embodiment

Figure 1:
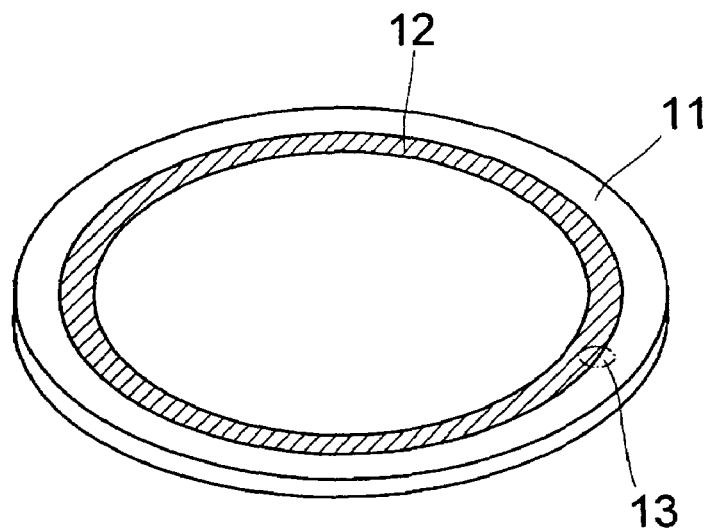
FIG. 1 is a perspective view of an optical scale according to a first embodiment.

In the first embodiment, an optical scale 11 has a main body composed, for example, of a disk-like glass substrate as shown in FIG. 1. On the optical scale 11, a reflective diffraction grating 12 with a constant pitch made of a metal film such as aluminum or chrome is annularly formed along the circumference of the optical scale 11. In addition, a convex lens 13 is provided on the backside of the optical scale 11 at a portion corresponding to the diffraction grating 12.

Figure 2:
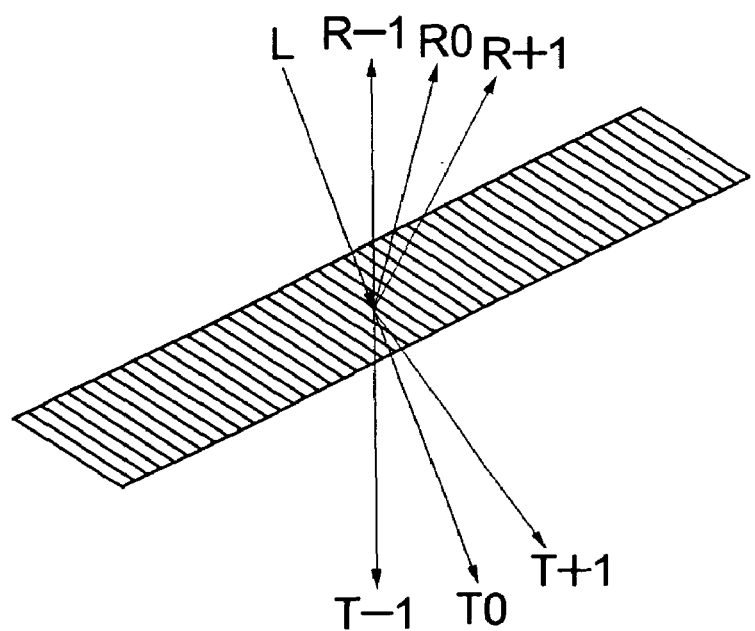
FIG. 2 illustrates light beams transmitted and reflected by a diffraction grating.

In the case where the diffraction grating 12 is an amplitude grating constituted by presence and absence of a reflective film, when a light beam L is projected onto it from above as shown in FIG. 2, 0-th order reflected light R0, plus 1st order reflected light R+1, minus first order reflected light R−1, 0-th order transmitted light T0, plus 1st order transmitted light T+1 and minus 1st order transmitted light T−1 are generated in addition to reflective diffracted light and transmissive diffracted light.

Figure 3:
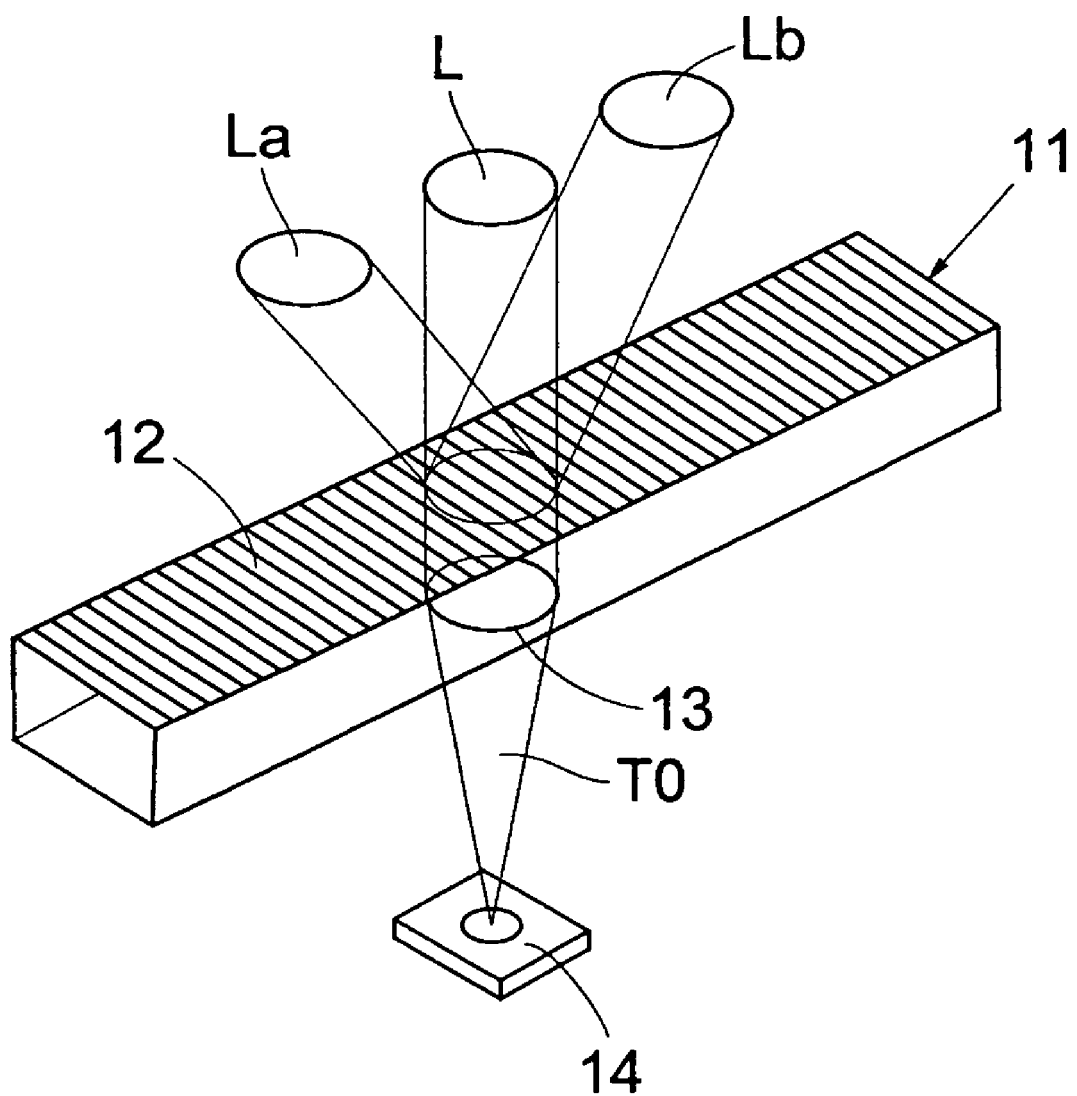
FIG. 3 schematically shows the optical scale.

FIG. 3 is a schematic partial view showing a part of the scale 11. A reference position signal detection sensor 14 composed, for example, of a photo diode is disposed below the optical scale 11. The convex lens 13 is used as a pattern for generating a reference position signal with the 0-th order transmitted light T0, and the diffraction grating 12 is used as a pattern for generating incremental signals.

A light beam L is incident on the diffraction grating 12, and resultant reflective diffracted light beams La and Lb are caused to interfere by an interference optical unit not shown. Thus, two incremental signals are generated. On the other hand, the 0-th order transmitted light T0 transmitted through the optical scale 11 and converged by the lens 13 is incident on the reference position signal detection sensor 14, whereby a reference position signal is generated.

Figure 4:
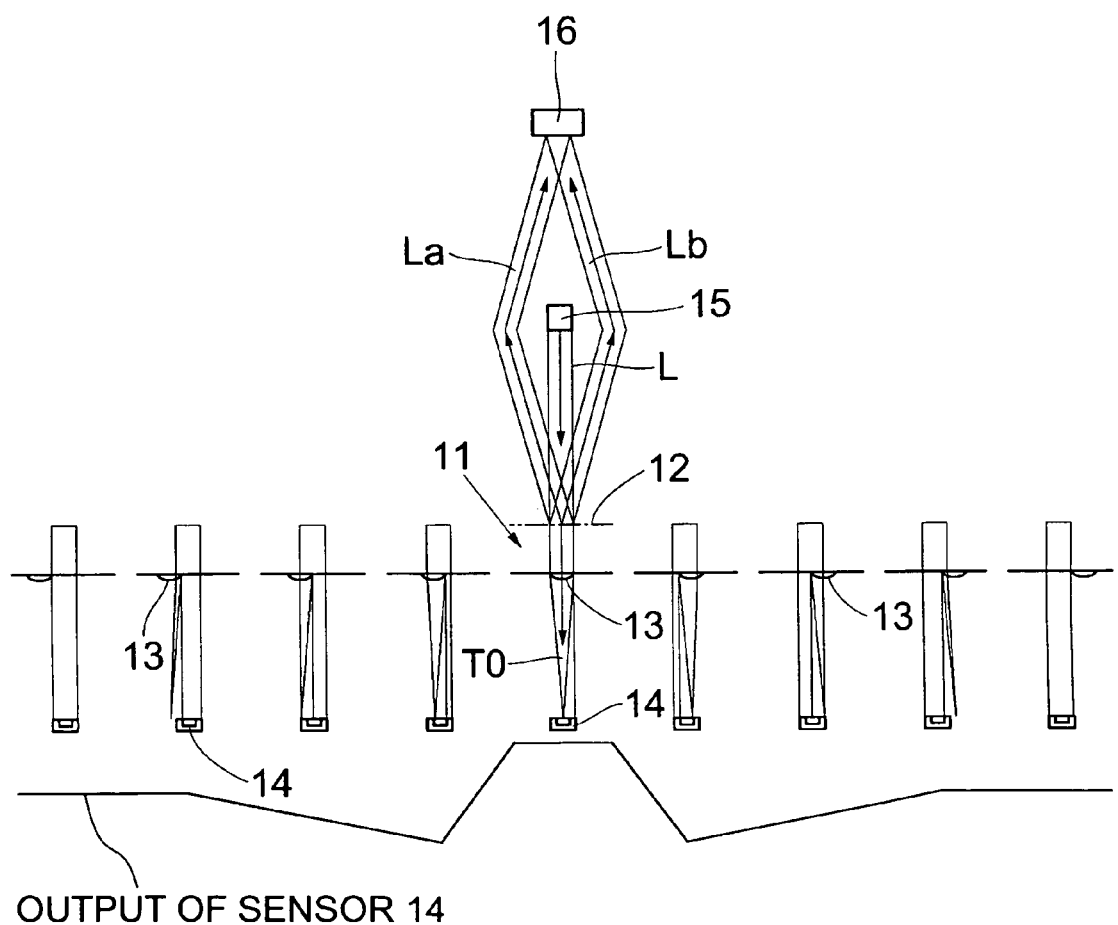
FIG. 4 illustrates a method of detecting a reference position signal.

FIG. 4 illustrates a method of detecting the reference position signal. The light quantity of the 0-th order transmitted light T0 derived from the light beam emitted from the light source 15 and transmitted through the diffraction grating 12 is constant if the structure and the material of the optical scale 11 is uniform. Therefore, the output of the reference position signal detection sensor 14 that detects the 0-th order transmitted light T0 is constant as long as the convex lens 13 is not present. When the convex lens 13 comes across the 0-th order transmitted light T0 with rotation of the optical scale 11, the light around it is converged and incident on the reference position signal detection sensor 14. This results in a increased output of the reference position signal detection sensor 14. This signal constitutes the reference position signal.

On the other hand, the reflective diffracted light beams La, Lb are detected by a diffracted light detection sensor 16 after interference with each other, whereby the speed and the angle etc. of the scale 11 are detected.

As per the above, in the first embodiment, it is not necessary to split out a light beam for generating a reference position signal. Accordingly, the structure of the detection optical unit can be made simple. Moreover, it is not necessary to use such a large diameter light beam with which both a diffraction grating for generating the incremental patterns and a convex lens as the pattern for generating the reference position signal are illuminated, and therefore the light beam L is utilized efficiently. Thus, the quality of the incremental signals is enhanced.

In addition, since the convex lens 13 is disposed coaxially with the illumination light for generating the incremental signals, relationship of the phases of the incremental signals and the reference position signal will not change with a change in the posture of the optical scale 11.

There is, for example, a high resolution encoder using a diffraction grating in which an incremental signal is obtained by interference of diffracted light beams. In this case, however, unnecessary 0-th order light and transmitted or reflected light are generated by the diffraction grating that serves as a signal for generating incremental signals.

In the first embodiment however, it is possible to detect the reference position signal at the position same as the pattern used for detecting incremental signals by illuminating an appropriate reference position pattern detection optical unit with 0-th order transmitted light T0.

Second Embodiment

Figure 5:
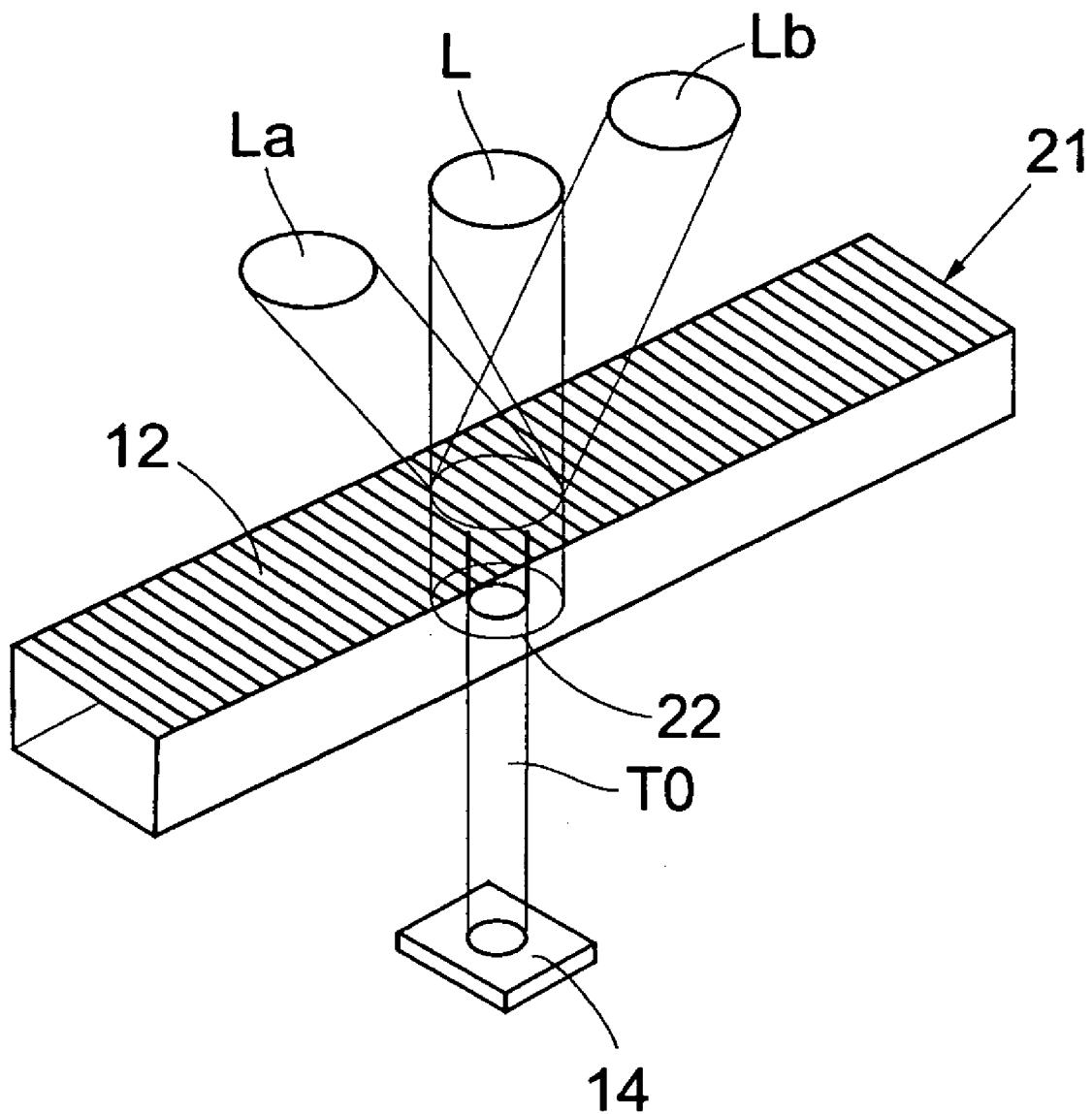
FIG. 5 schematically shows an optical scale according to a second embodiment.

FIG. 5 schematically shows the second embodiment. In this optical scale 21, a transmissive hole pattern 22 in the form of a pinhole is formed on the glass plate. As with the first embodiment, a reference position signal can be obtained as an increase in the light quantity detected by the reference position signal detection sensor 14 caused by 0-th order transmitted light T0 that has passed through the transmissive hole pattern 22.

The shape of the transmissive hole pattern 22 is not limited to a circle, but it may be a two-dimensional pattern such as a slit. Alternatively, a light blocking pattern may be formed instead of the transmissive hole pattern 22. In the case where a light blocking pattern is used, only the sign (i.e. plus and minus) of the light quantity detected is reversed.

Third Embodiment

Figure 6:
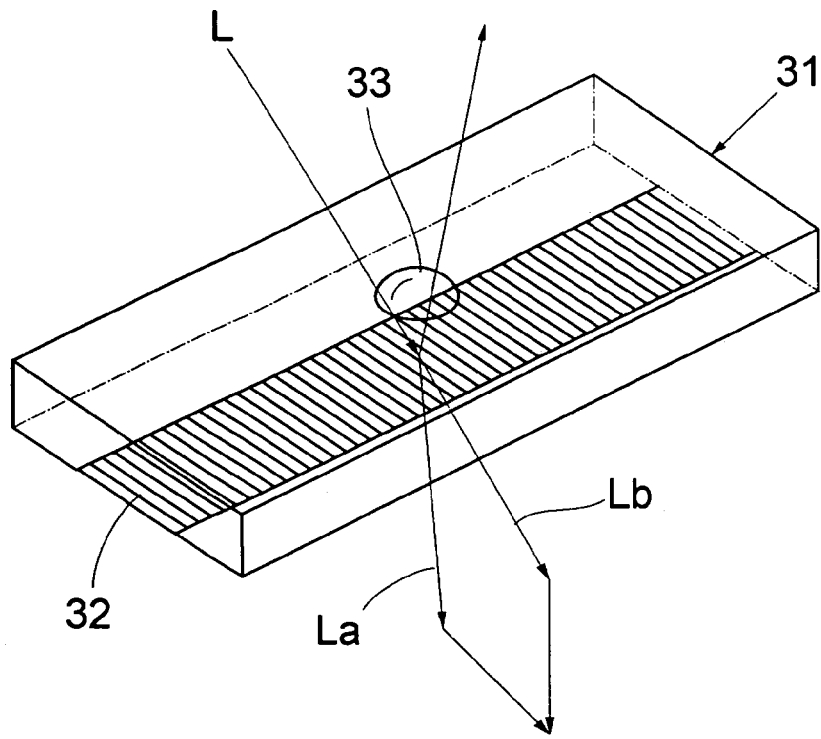
FIG. 6 schematically shows an optical scale according to a third embodiment.

FIG. 6 schematically shows the third embodiment.

On the back surface of an optical scale 31 composed of a glass substrate, a transmissive diffraction grating 32 serving as an incremental pattern is formed.

A convex lens 33 is formed on the upper surface of the optical scale 31.

Figure 7:
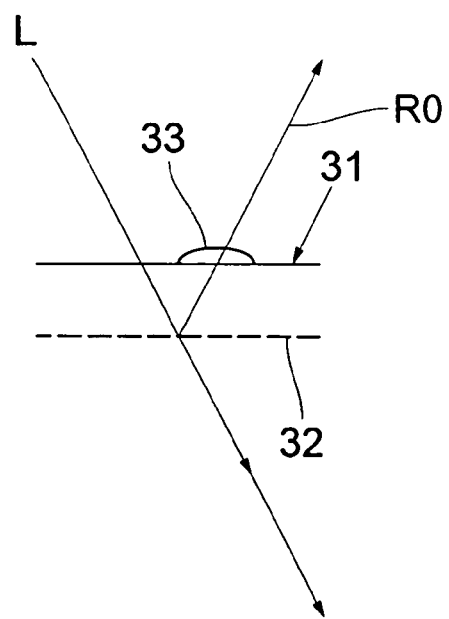
FIG. 7 shows light path of a light beam reflected by an diffraction grating.

As shown in FIG. 7, a light beam L is made incident on the diffraction grating 32 obliquely to its grating arranged direction, and 0-th order reflected light R0 reflected by the diffraction grating 32 is guided to the upper surface of the optical scale 31.

When entering the convex lens 33, the 0-th order reflected light R0 is converged onto a reference position signal detection sensor not shown, so that the reference position signal can be detected in a similar manner as in the first embodiment.

Figure 8:
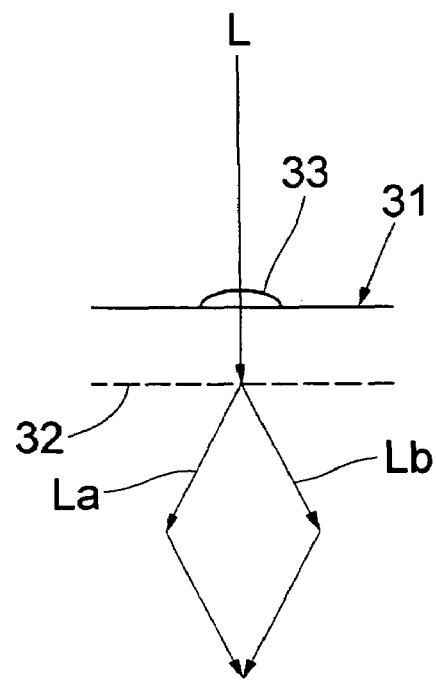
FIG. 8 shows light path of a light beam transmitted through an diffraction grating.
Figure 9:
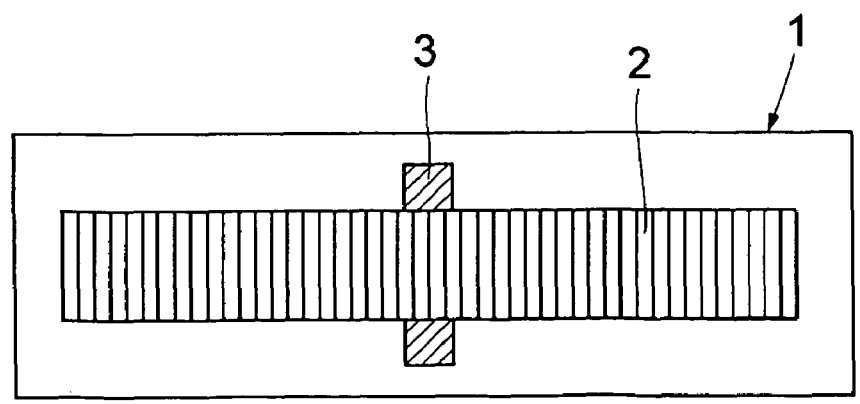
FIG. 9 is a plan view of a conventional optical scale.
Figure 10:
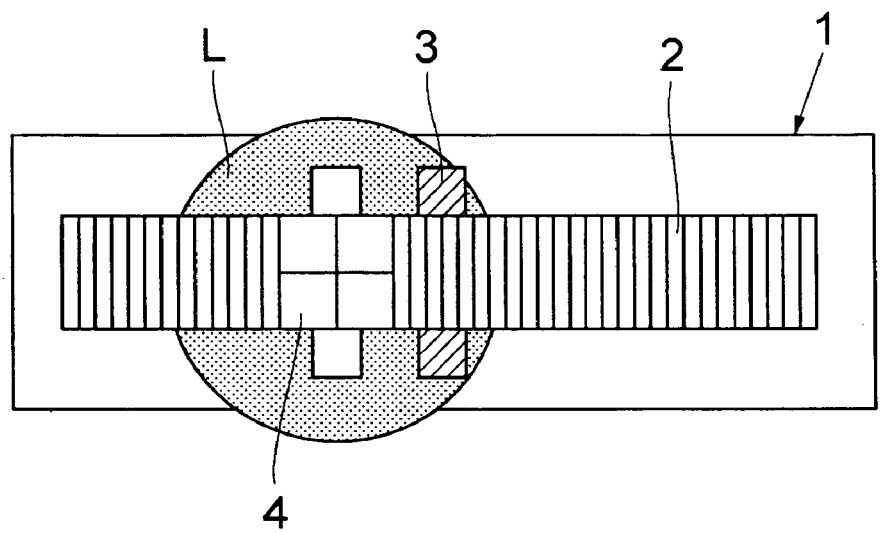
FIG. 10 is a plan view of the conventional optical scale in a state in which it is irradiated with a light beam.
Figure 11:
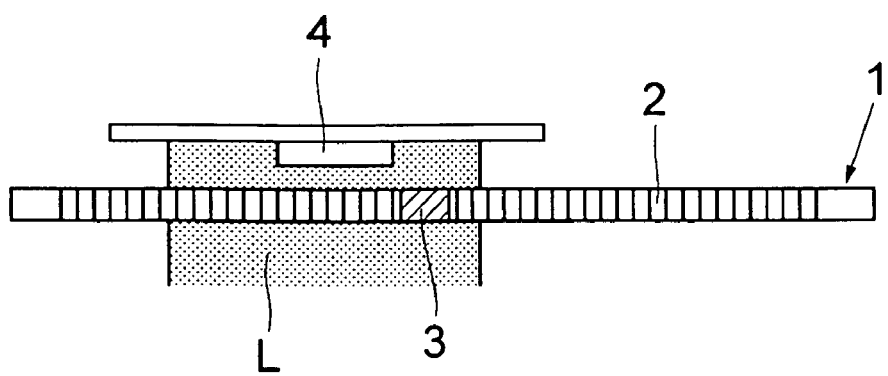
FIG. 11 is a side view of the conventional optical scale in a state in which it is irradiated with a light beam.

As shown in FIG. 8, 1st order diffracted light beams derived from the light beam L incident on the optical scale 31 and transmitted through the transmissive diffraction grating 32 are caused to interfere with each other to generate incremental signals.

The transmissive diffracted light beams La, Lb that have been transmitted through the diffraction grating 32 are made incident on an interference optical unit, so that two incremental signals are obtained.

The convex lens 33 used in the third embodiment may be replaced by an optical element such as a Fresnel lens.

The convex lenses 13, 33 used in the first and the third embodiment may be replaced by a transmissive hole pattern similar to that used in the second embodiment, a slit or a light blocking pattern.

This application claims priority from Japanese Patent Application No. 2004-338895 filed Nov. 24, 2004, which is hereby incorporated by reference herein.

What is claimed is:

1. An optical encoder for detecting relative movement of a scale unit and light projection unit, comprising:
    a scale unit;
    a light projection unit for projecting a light beam onto said scale unit;
    a diffraction grating portion formed on said scale unit and irradiated with said light beam;
    a reference position detection portion formed on said scale unit and irradiated with said light beam;
    a first sensor for generating an incremental signal using said light beam reflected by or transmitted through said diffraction grating portion;
    a second sensor for generating a reference position signal using said light beam reflected by or transmitted through said reference position detection portion immediately after being reflected by or transmitted through said diffraction grating portion,
    wherein when one of said incremental signal and said reference position signal is generated using a transmitted light component of said light beam, the other of said incremental signal and said reference position signal is generated using a reflected light component of said light beam, and
    wherein said reference position detection portion is a lens.

2. An optical encoder according to claim 1, wherein said reference position detection portion is disposed at the same position as a part of said diffraction grating portion.

3. An optical encoder according to claim 1, wherein said reference position detection portion is a Fresnel lens.

4. An optical encoder according to claim 1, wherein said diffraction grating portion and said reference position detection portion are formed on opposite surfaces of said scale unit.

5. An optical encoder according to claim 4, wherein said diffraction grating portion and said reference position detection portion have portions partly overlapping with each other at least as seen from a direction perpendicular to the scale unit.

* * * * *